(12) United States Patent
Firby et al.

(10) Patent No.: US 9,818,404 B2
(45) Date of Patent: Nov. 14, 2017

(54) ENVIRONMENTAL NOISE DETECTION FOR DIALOG SYSTEMS

(71) Applicant: Intel Corporation, Santa Clara, CA (US)

(72) Inventors: Robert Jim Firby, San Mateo, CA (US); Peter Graff, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/979,189

(22) Filed: Dec. 22, 2015

(65) Prior Publication Data

US 2017/0178627 A1 Jun. 22, 2017

(51) Int. Cl.
*G10L 15/22* (2006.01)
*G10L 25/84* (2013.01)

(52) U.S. Cl.
CPC .............. *G10L 15/22* (2013.01); *G10L 25/84* (2013.01); *G10L 2015/221* (2013.01); *G10L 2015/226* (2013.01)

(58) Field of Classification Search
CPC ...................................................... G10L 15/22
See application file for complete search history.

(56) References Cited

U.S. PATENT DOCUMENTS

| 6,347,299 | B1 | | 2/2002 | Holzman et al. | |
|---|---|---|---|---|---|
| 7,167,544 | B1 | * | 1/2007 | Bauer | G10L 15/22 379/88.01 |
| 7,415,415 | B2 | | 8/2008 | Clelland et al. | |
| 7,538,685 | B1 | | 5/2009 | Cooper et al. | |
| 7,552,054 | B1 | * | 6/2009 | Stifelman | G10L 15/22 704/270 |
| 8,019,050 | B2 | * | 9/2011 | Mactavish | G10L 21/06 379/22.08 |
| 9,495,960 | B1 | * | 11/2016 | Moore | H04M 3/493 |
| 2002/0107695 | A1 | * | 8/2002 | Roth | G10L 15/22 704/275 |
| 2008/0147397 | A1 | * | 6/2008 | Konig | G10L 21/02 704/246 |
| 2010/0198093 | A1 | * | 8/2010 | Katayama | G10L 15/22 600/519 |
| 2014/0303970 | A1 | * | 10/2014 | Bell | G10L 15/20 704/233 |

(Continued)

OTHER PUBLICATIONS

"Voice Controls and Displays for the Dismounted Soldier," Thompson, L., et al., *Humansystem*, Incorporation, Guelph, ON, Canada on behalf of Department of National Defence, DRDC Toronto Scientific Authority, Oct. 2005, 36 pgs.

*Primary Examiner* — Douglas Godbold
(74) *Attorney, Agent, or Firm* — Patent Capital Group (57) ABSTRACT

Embodiments are directed to receiving a speech signal representative of audible speech, processing the speech signal to interpret the speech signal by a dialog system implemented at least partially in hardware, determining, by the dialog system, that the speech signal cannot be correctly interpreted, receiving a noise signal representative of audible background noise, identifying a noise level from the noise signal, determining, by the dialog system, that the noise level is too high for the speech signal to be correctly interpreted, and providing, by the dialog system, a message indicating that the noise level is too high for the speech signal to be correctly interpreted.

22 Claims, 9 Drawing Sheets

(56) References Cited

U.S. PATENT DOCUMENTS

| | | | |
|---|---|---|---|
| 2015/0255085 A1* | 9/2015 | Yamabe | G10L 21/0208 704/226 |
| 2015/0319527 A1* | 11/2015 | Petit | G10L 21/0208 381/71.1 |
| 2015/0364136 A1* | 12/2015 | Katuri | H04R 3/02 704/233 |

* cited by examiner

ENVIRONMENTAL NOISE DETECTION FOR DIALOG SYSTEMS

TECHNICAL FIELD

This disclosure pertains to environmental noise detection for dialog system enhancement.

BACKGROUND

Dialog systems can use natural language interfaces, including speech interfaces, to provide a user with desired information or execute commands. A dialog between a user and a device includes components to help the dialog system understand what the user is saying. Environmental noise can make distinguishing noise from human speech in a given signal difficult, and can be highly varied.

DETAILED DESCRIPTION

One of the big challenges in automatic speech recognition is recognizing speech under noise. Nonetheless, language-based technologies and applications with natural language interfaces could benefit from i) adapting to noise environments and ii) providing the user with feedback about the noise environment. For a language-based application to provide a feedback message, such as, "Sorry it's too loud for me to hear you," can dramatically improve the users experience because the user will know why the user is not getting the intended results and how to correct the issue. This disclosure describes determining the level of noise and using the noise level to alert the user when the noise level is too high for the user to be understood by the application.

This disclosure describes collecting audio whenever possible and inferring the current noise level from historical audio levels. A threshold is set (e.g., by a developer or dynamically by the user) at which the noise level is too great for state-of-the-art noise filtering to improve expected speech recognition performance such that communication between the user and the application becomes possible. If the noise level exceeds the threshold, the dialog system of the application is alerted to this fact and may provide feedback to the user.

Figure 1:
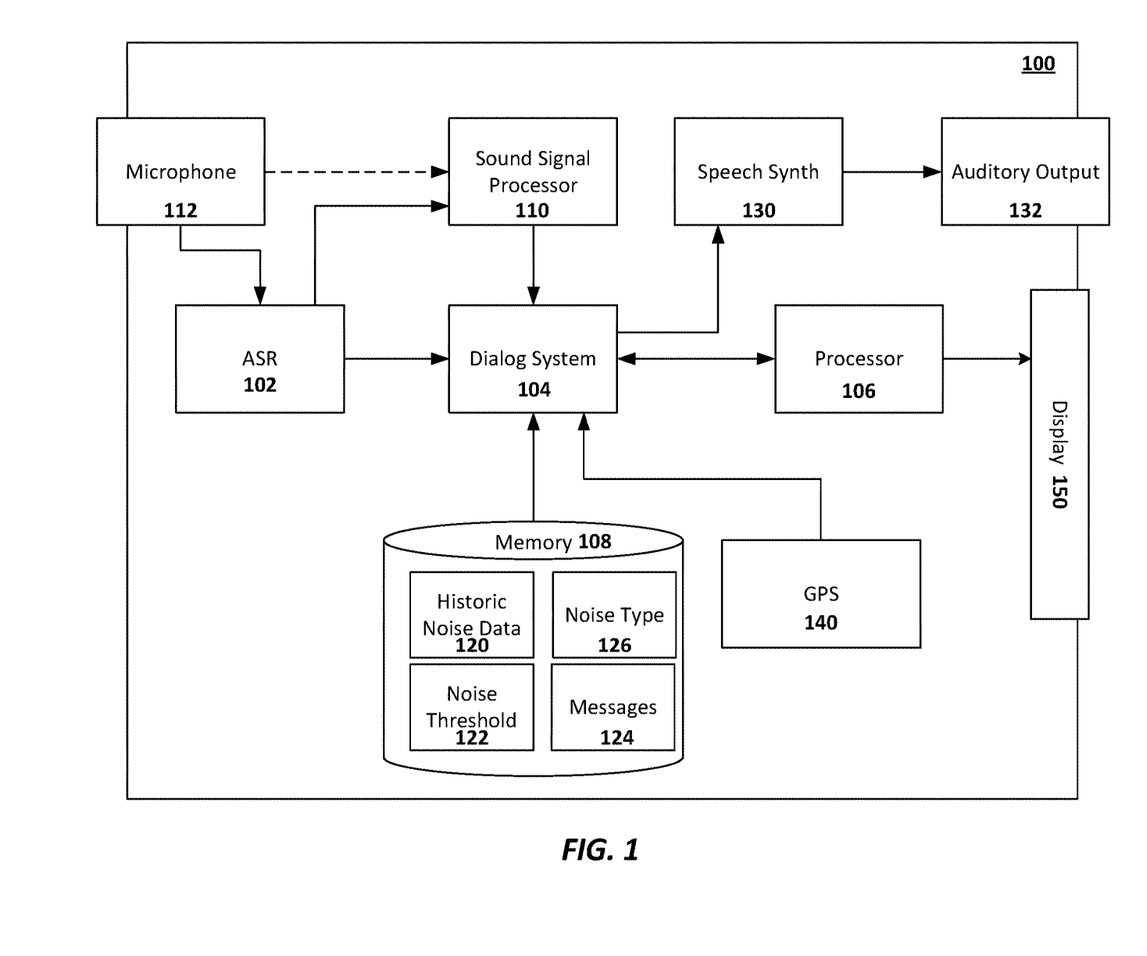
FIG. 1 is a schematic block diagram of a system that includes a noise level input to a dialog system in accordance with embodiments of the present disclosure.

FIG. 1 is a schematic block diagram of a system 100 that includes a noise level input to a dialog system 104 in accordance with embodiments of the present disclosure. System 100 can be a mobile phone, tablet, wearable device, personal computer, laptop, desktop computer, or any computing device that can be interfaced by a user through speech. The system 100 includes a dialog system 104.

The system 100 includes an automatic speech recognition (ASR) module 102 that can be implemented in hardware, software, or a combination of hardware and software. The ASR module 102 can be communicably coupled to and receive input from a microphone 112. The ASR module 102 can output recognized text to a dialog system 104 based on one or more linguistic models. The ASR module 102 can also receive audible background noise from the microphone 112.

Generally, the dialog system 104 can receive textual inputs from the ASR module 102. The dialog system 104 can interpret the textual speech input and provide an appropriate response, in the form of an executed command, a verbal response (oral or textual), or some combination of the two. The system 100 also includes a processor 106 for executing instructions from the dialog system 104.

In some embodiments, the system 100 can also include a speech synthesizer 130 that can synthesize a voice output from the textual speech. System 100 can include an auditory output 132 that outputs audible sounds, including synthesized voice sounds.

In some embodiments, the system 100 can also include a display 150 that can display textual information and images as part of a dialog, as a response to an instruction or inquiry, or for other reasons.

In some embodiments, system 100 also includes a global position system (GPS) 114 configured to provide location information to system 100. In some embodiments, the GPS system 114 can input location information into the dialog system 104 so that the dialog system 104 can use the location information for contextual interpretation of speech text received from the ASR module 102.

As mentioned previously, the microphone 112 can receive audible speech input and covert the audible speech input into an electronic speech signal (referred to as a speech signal). The electronic speech signal can be provided to the ASR module 102. The ASR module 102 uses linguistic models to convert the electronic speech signal into a text format of words, such as a sentence or sentence fragment representing a user's request or instruction to the system 100.

The microphone 112 can also receive audible background noise. Audible background noise can be received at the same time as the audible speech input or can be received upon request by the dialog system 100 independent of the audible speech input. The microphone 112 can convert the audible background noise into an electrical signal representative of the audible background noise (referred to as a noise signal).

The noise signal can be processed by a sound signal processor 110 implemented in hardware, software, or a combination of hardware and software. The sound signal processor 110 can be part of the ASR module 102 or can be a separate hardware and/or software module. In some embodiments, a single signal that includes both the speech signal and the noise signal are provided to the sound signal processor 110. The sound signal processor 110 can determine a signal to noise ratio (SNR) of the speech signal to the noise signal. The SNR represents a level of background noise that may be present with the audible speech input. In some embodiments, the sound signal processor 110 can determine a noise level of the background noise.

In some embodiments, a speech signal (which may coincidentally include a noise signal) can be provided to the ASR module 102. The ASR module 102 can recognize the speech signal and covert the recognized speech signal into a textual format without addressing the background noise. The textual format of the recognized speech signal can be referred to as recognized speech, but it is understood that recognized speech is in a format compatible with the dialog system 104.

The dialog system 104 can receive the recognized speech from the ASR module 102. The dialog system 104 can interpret the recognized speech to identify what the speaker wants. For example, the dialog system 104 can include a parser for parsing the recognized speech and an intent classifier for identifying intent from the parsed recognized speech.

In some cases, the recognized speech cannot be interpreted to be something meaningful to the dialog system 104. In some embodiments, the ASR module 102 inaccurately recognizes the speech signal and output recognized text is nonsense or is something that the dialog system cannot understand or interpret. After making attempts to interpret the recognized speech signal, the dialog system 104 can determine whether the background noise is too high for the ASR module 102 to accurately recognize the audible speech. If the background noise level is too high, then the dialog system 104 can output a message to the user, either through a speech synthesizer 130 and an auditory output 132 or through a visual message on a display 150, that the background noise is too high for the system 100 to understand what the user is asking for. Auditory output 132 can include a speaker, a headphone output, a Bluetooth connected device, etc.

In some embodiments, the sound signal processor 110 is configured to preprocess the captured speech signal to determine if the noise level is above the threshold value. If the noise level is above the threshold value, then the dialog system 104 can notify the user without the ASR module 102 analyzing the speech signal. This preprocessing would minimize the processing power used by the ASR module 102 because the ASR module 102 would not have to try to recognize the speech signal. In cases where the noise level is below the threshold can be stored as historic noise data to be used for updating the noise threshold. Additionally, the ASR module 102 would proceed to recognize the speech signal and forward the recognized speech to the dialog system 104.

In some embodiments, both the ASR module 102 and sound signal processor 110 can process the speech signal simultaneously. If the sound signal processor 110 issues a signal that the noise level in the speech signal exceeds the threshold noise level, then the ASR module 102 can automatically stop analyzing the speech signal, thus saving processing power. Sometimes, the sound signal processor 110 may have a noise level that is below the threshold but the ASR translates the speech signal into something that is still unrecognizable by the dialog system 104. In these instances, the noise level captured by the sound signal processor can be stored in historic noise data and used to adjust the threshold noise level.

The system 100 can include a memory 108 implemented at least partially in hardware. The memory 108 can store data that assists the dialog system 104 in determining whether the noise level is too high. For example, the memory 108 can store a predetermined noise level threshold value 122. The noise level threshold value 122 can be a numeric value against which the noise level is compared to determine whether the noise level is too high for audible speech to be accurately interpreted. The noise level threshold 122 can also be an SNR threshold, in which case the SNR of the speech signal to the noise signal can be compared to the SNR threshold. If the SNR of the speech signal to the noise signal is lower than the SNR threshold, then the dialog system 104 can infer that the noise level is too high for the ASR module 102 to accurately recognize the audible speech.

The memory 108 can also store historic noise data 120. The system 100 can store historic noise levels to dynamically establish a threshold noise level 122 based on a correlation between failed attempts to recognize audible speech and concurrently received noise levels.

The memory 108 can also store a message 124. The message 124 can be a generic message provided to the user when the dialog system 104 determines that the noise level is too high for the ASR module 102 to accurately recognized audible speech. In some embodiments, the message can be a specific message tailored to the type of background noise received. The type of background noise can be identified by the sound signal processor 110 based on training and based on stored noise types 126. The dialog system 104 can output a noise-specific message to the user so that the user can have a better understanding of what is causing the background noise.

Figure 2:
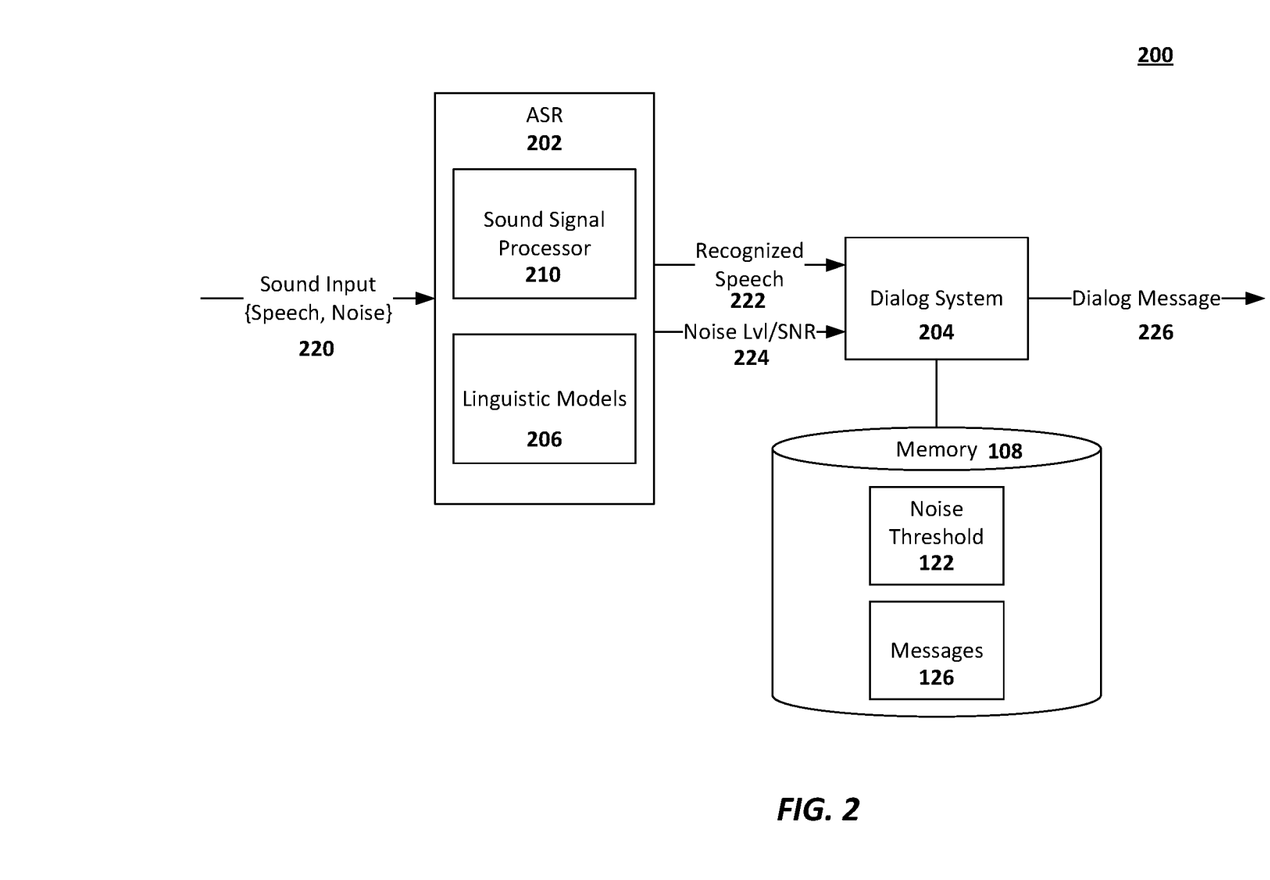
FIG. 2 is a schematic block diagram of a first example speech and noise processor in accordance with embodiments of the present disclosure.

FIG. 2 is a schematic block diagram 200 of a first example speech and noise processor in accordance with embodiments of the present disclosure. In the example embodiment shown in FIG. 2, the ASR 202 can receive a sound input 220. The sound input 220 includes a speech signal representative of audible speech by a user and a noise signal representative of audible background noise {Speech, Noise}. The ASR 202 can include both a sound signal processor 210 and linguistic models 206. The sound signal processor 210 can determine a noise level and/or a signal to noise ratio from the received sound input 220. The ASR module 202 can also recognize the speech signal to convert the speech signal to recognized text or recognized speech. The ASR module 202 can provide the recognized speech 222 and the noise level/SNR 224 to the dialog system 204 at substantially the same time. The dialog system 204 can receive the recognized speech 222 and attempt to interpret the intent of the user who spoke the speech input to the system. If the dialog system 204 cannot interpret the recognized speech 222, the dialog system 204 can determine whether the background noise is too high. For example, the dialog system 204 can determine whether the noise level is greater than (or greater than or equal to) a threshold noise level 122. In some embodiments, if the SNR is used, then the dialog system 204 can determine whether the SNR is less than (or less than or equal to) a threshold SNR level 122.

If the dialog system 204 determines that the noise level is too high for the ASR module 202 to accurately recognize speech inputs, then the dialog system 204 can output a message to the user via text message or by audible messaging (e.g., via headphones if connected) that the background noise is too loud for audible instructions. Alternatively if the noise level is below the threshold yet the dialog system 204 is unable to interpret the intent of the user who spoke the speech input to the system, then the dialog system 204 can output a message to the user (via text message or by audible messaging) to please repeat the message again.

Figure 3:
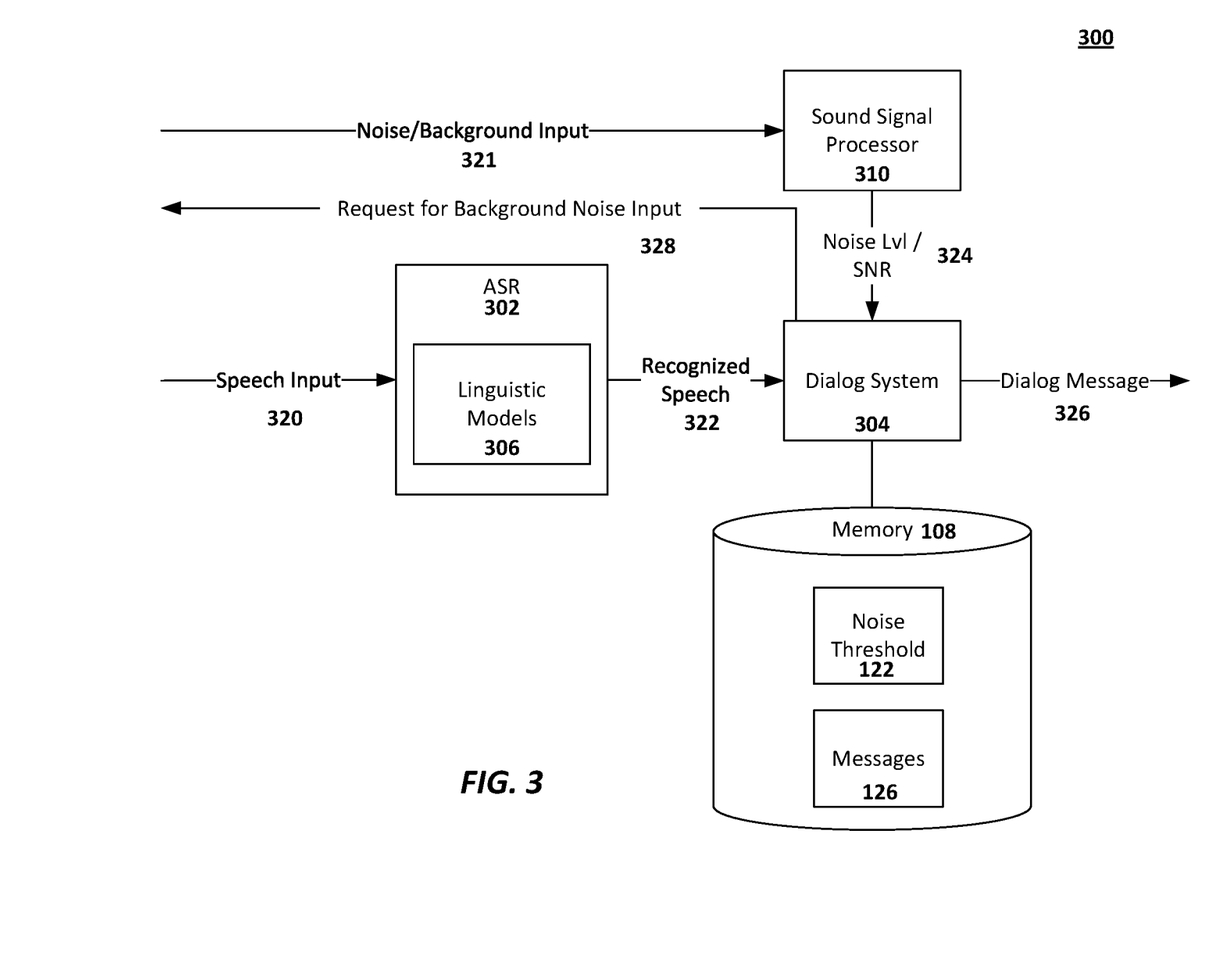
FIG. 3 is a schematic block diagram of a second example speech and noise processor in accordance with embodiments of the present disclosure.

FIG. 3 is a schematic block diagram 300 of a second example speech and noise processor in accordance with embodiments of the present disclosure. In the example embodiment shown in FIG. 3, the ASR 302 can receive a sound input 320. The sound input 320 includes a speech signal representative of audible speech by a user. It is understood that the speech signal will likely include coincident background noise, but the background noise may be ignored in this initial speech signal. The ASR 302 can include linguistic models 306. The ASR module 302 can also recognize the speech signal to convert the speech signal to recognized text or recognized speech. The ASR module 302 can provide the recognized speech 322 to the dialog system 304 at substantially the same time as the noise level. The dialog system 304 can receive the recognized speech 322 and attempt to interpret the intent of the user who spoke the speech input to the system. If the dialog system 304 cannot interpret the recognized speech 222, the dialog system 304 can request a background noise signal 328. The noise/background input signal 321 can be input to the sound signal processor 310, which can be part of the ASR module 302 or a standalone hardware or software module. The sound signal processor 310 can determine a noise level or SNR. The sound signal processor 310 can provide the noise level or SNR 324 to the dialog system 304. For example, the dialog system 204 can determine whether the noise level is greater than (or greater than or equal to) a threshold noise level 122 stored in memory 108. In some embodiments, if the SNR is used, then the dialog system 304 can determine whether the SNR is less than (or less than or equal to) a threshold SNR level 122 stored in memory 108.

If the dialog system 304 determines that the noise level is too high for the ASR module 302 to accurately recognize speech inputs, then the dialog system 304 can output a message (such as a message 126 stored in memory 108) to the user via text message or by audible messaging (e.g., via headphones if connected).

In some embodiments, the noise level may not exceed the threshold level but the dialog system may still not be able to interpret the input from the user. In that case, the dialog system can request that the user repeat the request.

Figure 4:
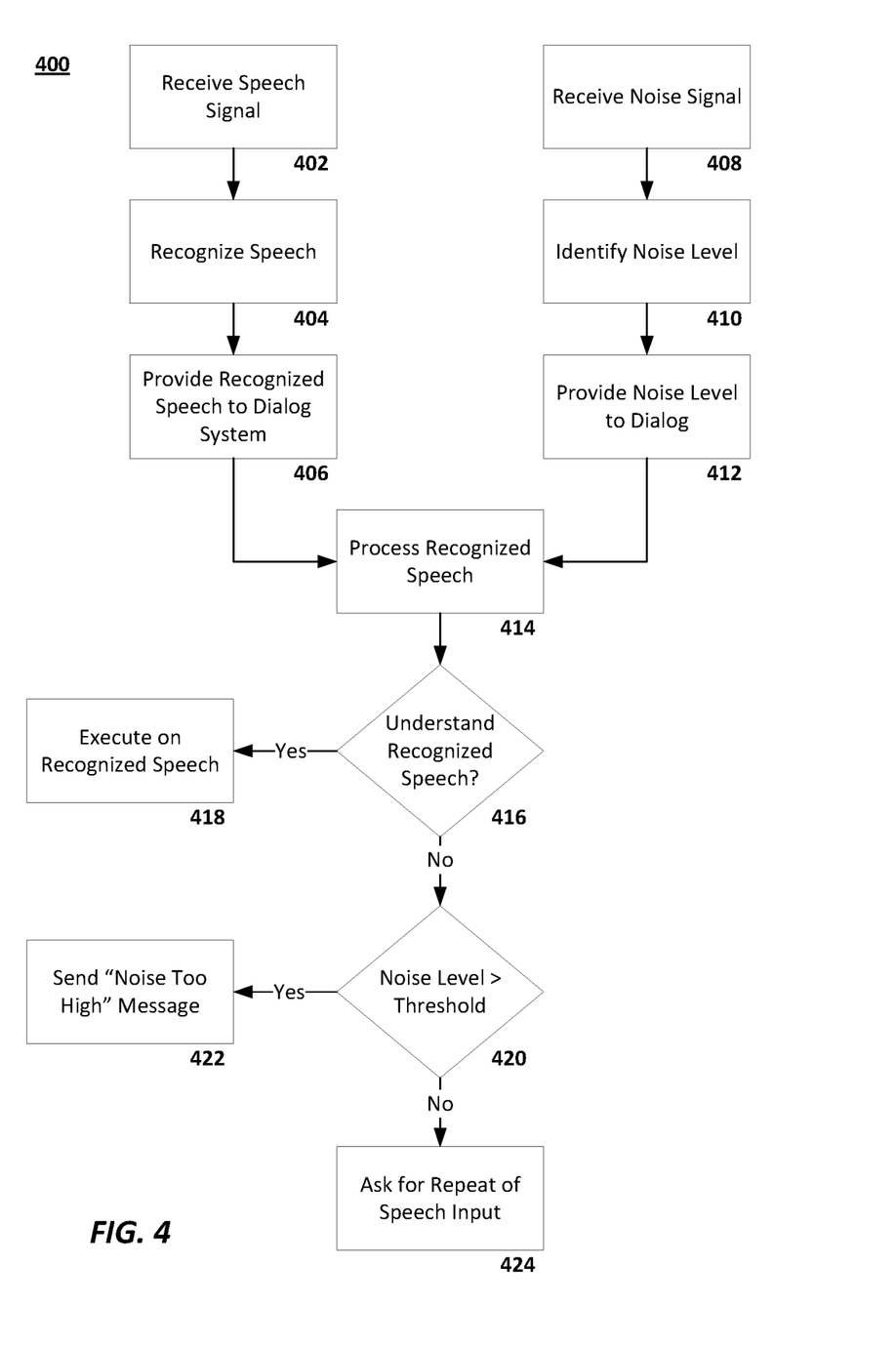
FIG. 4 is a process flow diagram for processing a speech signal based on a noise level in accordance with embodiments of the present disclosure.

FIG. 4 is a process flow diagram 400 for processing a speech signal based on a noise level in accordance with embodiments of the present disclosure. A speech signal representative of audible speech can be received (402). For example, a speech signal can be received by an automatic speech recognition system (ASR) implemented at least partially in hardware, but can also be implemented in software. The ASR can recognize the speech signal (404). The recognized speech can be provided to a dialog system implemented at least in hardware (406). For example, the recognized speech can be converted into text by the ASR and the recognized text (referred to as recognized speech) is sent to the dialog system.

The incident sound signal carrying the audible speech may also include background noise. The background noise signal representative of audible background noise can be received (408). For example, the background noise signal can be received by a sound signal processor, which can be a stand-alone hardware and/or software module or can be integrated hardware and/or software module. In some embodiments, the noise signal is received with the speech signal. In some embodiments, the background noise signal can be received shortly after the speech signal. For example, after a user has stopped speaking, the device can continue receiving audible input for several seconds. This additional input would include background noise representative of the noise that is occurring in a time period proximate to when the user is speaking. The signal processor can identify a noise level or signal to noise ratio (SNR) for the background noise (410). The noise level or SNR can be provided to the dialog system (412).

The dialog system can process the recognized speech (414) to attempt to interpret the intent of the user that provided the audible speech signal (416). If the recognized speech is understandable, then the dialog system can proceed to execute actions, send messages, provide instructions to the processor, etc. based on the understood intent of the user (418).

If, however, the dialog system cannot understand the intent of the recognized speech signal, the dialog system can compare the noise level to a threshold noise level (420). If the noise level is greater than (or greater than or equal to) the threshold noise level, then the dialog system can send a message to the user indicating that the noise level is too high for the ASR to accurately recognize the audible speech (422). If the noise level is less than (or less than or equal to) the threshold noise level, then the dialog system can ask the user to repeat the audible speech (424).

In some embodiments, the SNR can be used to quantify the noise level. If the SNR is used, then the dialog system can compare the SNR to a threshold SNR level. If the SNR is less than (or less than or equal to) a threshold SNR, then the dialog system can send a message to the user indicating that the noise level is too high for the ASR to accurately recognize the audible speech. If the SNR is greater than (or greater than or equal to) the threshold SNR, then the dialog system can ask the user to repeat the audible speech.

Figure 5:
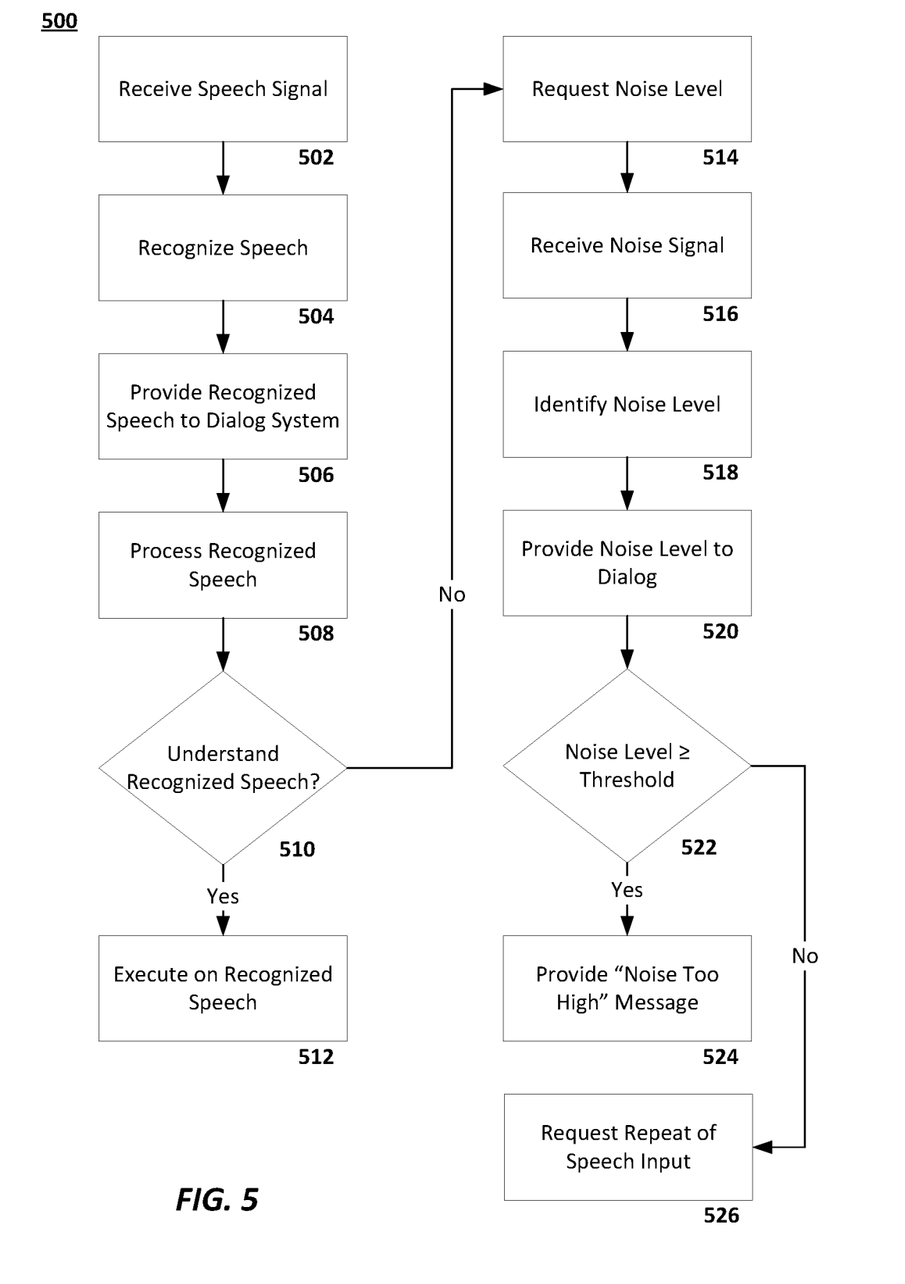
FIG. 5 is a process flow diagram for processing a speech signal based on a noise level in accordance with embodiments of the present disclosure.

FIG. 5 is a process flow diagram 500 for processing a speech signal based on a noise level in accordance with embodiments of the present disclosure. A speech signal representative of audible speech can be received (502). For example, a speech signal can be received by an automatic speech recognition system (ASR) implemented at least partially in hardware, but can also be implemented in software. The ASR can recognize the speech signal (504). The recognized speech can be provided to a dialog system implemented at least in hardware (506). For example, the recognized speech can be converted into text by the ASR and the recognized text (referred to as recognized speech) is sent to the dialog system.

The dialog system can process the recognized speech (508) to attempt to interpret the intent of the user that provided the audible speech signal (510). If the recognized speech is understandable, then the dialog system can proceed to execute actions, send messages, provide instructions to the processor, etc. based on the understood intent of the user (512).

If, however, the dialog system cannot understand the intent of the recognized speech signal, the dialog system can request a level of the background noise (514). The background noise signal representative of audible background noise can be received (516). For example, the background noise signal can be received by a sound signal processor, which can be a stand-alone hardware and/or software module or can be integrated hardware and/or software module. The signal processor can identify a noise level or signal to noise ratio (SNR) for the background noise (518). The noise level or SNR can be provided to the dialog system (520).

The dialog system can compare the noise level to a threshold noise level (522). If the noise level is greater than (or greater than or equal to) the threshold noise level, then the dialog system can send a message to the user indicating that the noise level is too high for the ASR to accurately recognize the audible speech (524). If the noise level is less than (or less than or equal to) the threshold noise level, then the dialog system can ask the user to repeat the audible speech (526).

In some embodiments, the SNR can be used to quantify the noise level. If the SNR is used, then the dialog system can compare the SNR to a threshold SNR level. If the SNR is less than (or less than or equal to) a threshold SNR, then the dialog system can send a message to the user indicating that the noise level is too high for the ASR to accurately recognize the audible speech. If the SNR is greater than (or greater than or equal to) the threshold SNR, then the dialog system can ask the user to repeat the audible speech.

Figure 6:
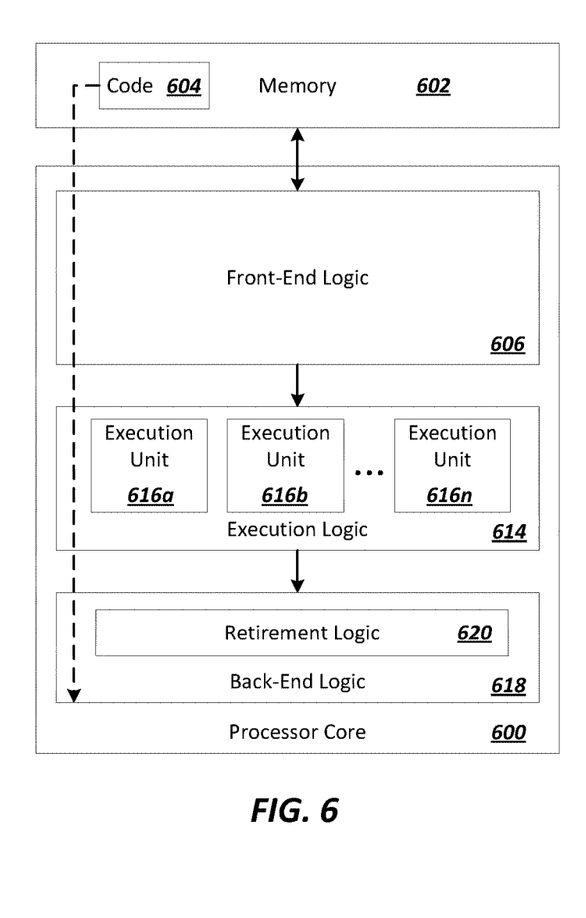
FIG. 6 is an example illustration of a processor according to an embodiment of the present disclosure.
Figure 7:
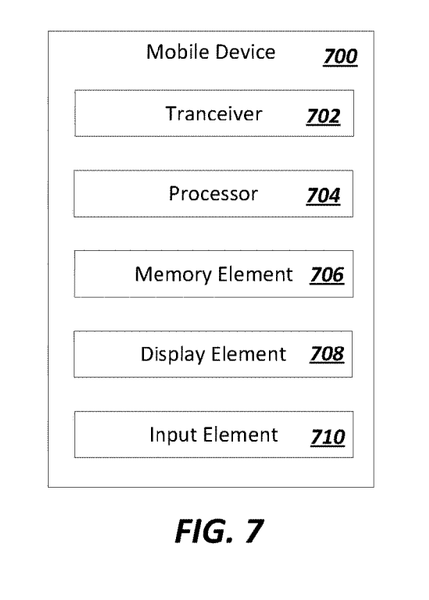
FIG. 7 is a schematic block diagram of a mobile device in accordance with embodiments of the present disclosure.
Figure 8:
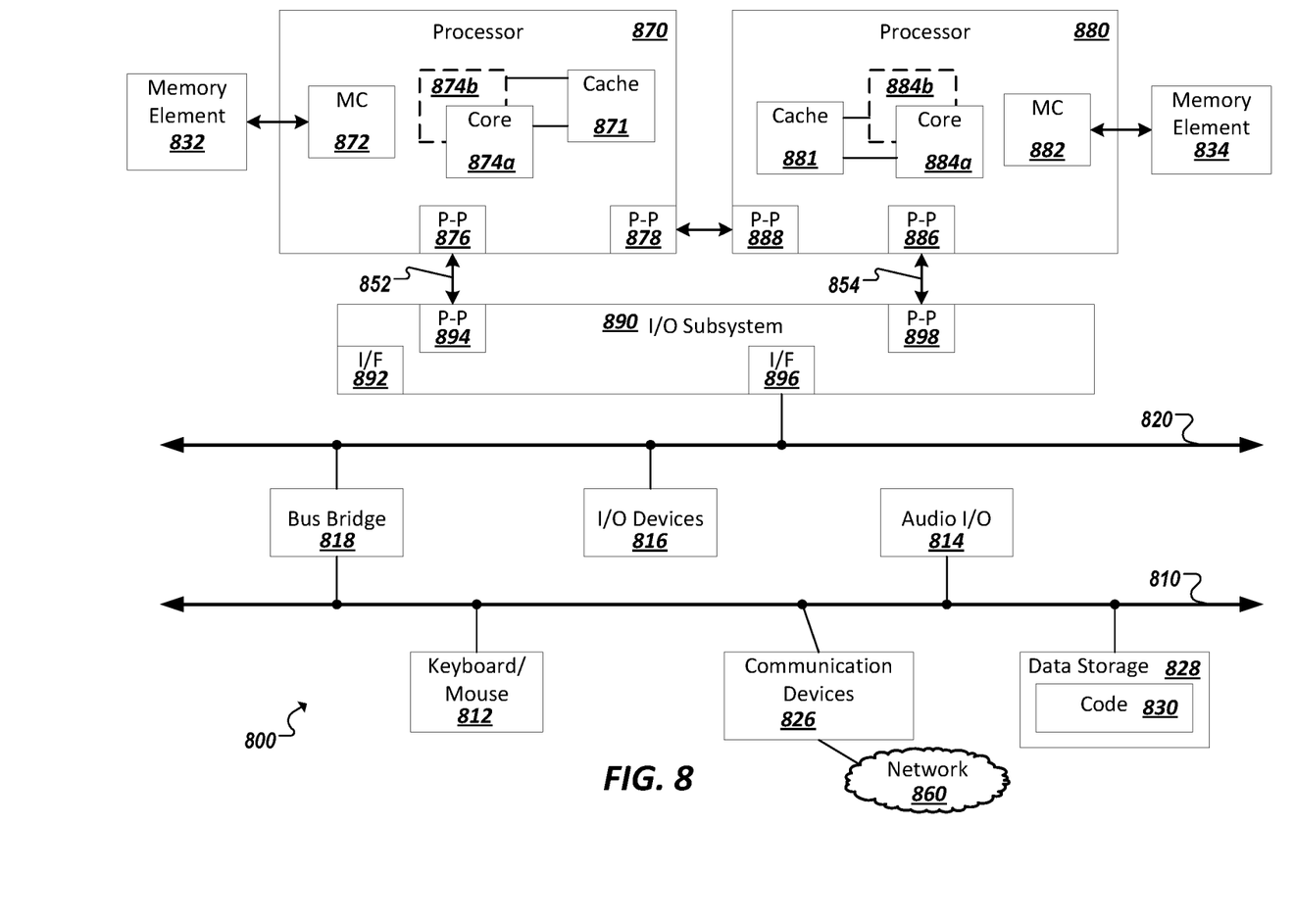
FIG. 8 is a schematic block diagram of a computing system according to an embodiment of the present disclosure.

FIGS. 6-8 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 6-8.

FIG. 6 is an example illustration of a processor according to an embodiment. Processor 600 is an example of a type of hardware device that can be used in connection with the implementations above.

Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616*a*, 616*b*, 616*n*, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 720 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

Referring now to FIG. 7, a block diagram is illustrated of an example mobile device 700. Mobile device 700 is an example of a possible computing system (e.g., a host or endpoint device) of the examples and implementations described herein. In an embodiment, mobile device 700 operates as a transmitter and a receiver of wireless communications signals. Specifically, in one example, mobile device 700 may be capable of both transmitting and receiving cellular network voice and data mobile services. Mobile services include such functionality as full Internet access, downloadable and streaming video content, as well as voice telephone communications.

Mobile device 700 may correspond to a conventional wireless or cellular portable telephone, such as a handset that is capable of receiving "3G", or "third generation" cellular services. In another example, mobile device 700 may be capable of transmitting and receiving "4G" mobile services as well, or any other mobile service.

Examples of devices that can correspond to mobile device 700 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 700 illustrated in FIG. 8 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 700 includes a transceiver 702, which is connected to and in communication with an antenna. Transceiver 702 may be a radio frequency transceiver. Also, wireless signals may be transmitted and received via transceiver 702. Transceiver 702 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 702 is connected to a processor 704, which may perform the bulk of the digital signal processing of signals to be communicated and signals received, at the baseband frequency. Processor 704 can provide a graphics interface to a display element 708, for the display of text, graphics, and video to a user, as well as an input element 710 for accepting inputs from users, such as a touchpad, keypad, roller mouse, and other examples. Processor 704 may include an embodiment such as shown and described with reference to processor 600 of FIG. 6.

In an aspect of this disclosure, processor 704 may be a processor that can execute any type of instructions to achieve the functionality and operations as detailed herein. Processor 704 may also be coupled to a memory element 706 for storing information and data used in operations performed using the processor 704. Additional details of an example processor 704 and memory element 706 are subsequently described herein. In an example embodiment, mobile device 700 may be designed with a system-on-a-chip (SoC) architecture, which integrates many or all components of the mobile device into a single chip, in at least some embodiments.

FIG. 8 is a schematic block diagram of a computing system 800 according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Figure 9:
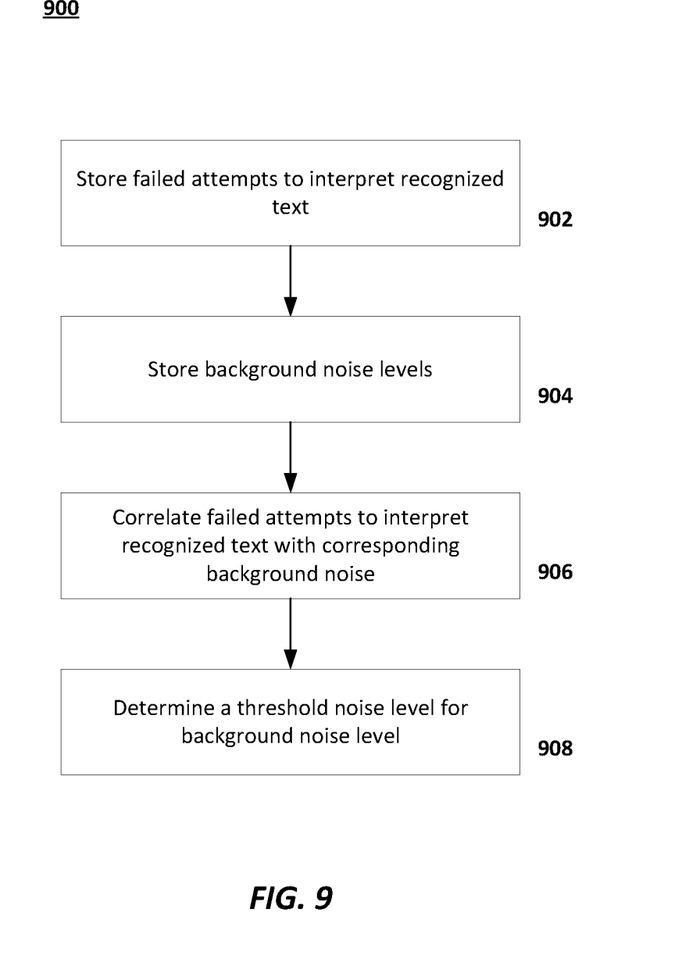
FIG. 9 is a process flow diagram for dynamically determining a threshold noise level.

FIG. 9 is a process flow diagram 900 for dynamically determining a threshold noise level. The dialog system can store failed attempts to interpret recognized speech (902). The dialog system can also store coincidental background noise levels (i.e., background noise that may be received at the same time as the audible speech signal) (904). The dialog system can correlate failed attempts to interpret recognized text with the corresponding background noise (906). For example, the dialog system can consider whether the recognized text was interpreted correctly, the number of times the user had to repeat him/herself, etc. The dialog system can determine a threshold noise level for background noise level for determining whether the noise level is too high for the ASR to accurately recognize audible speech (908).

Figure 10:
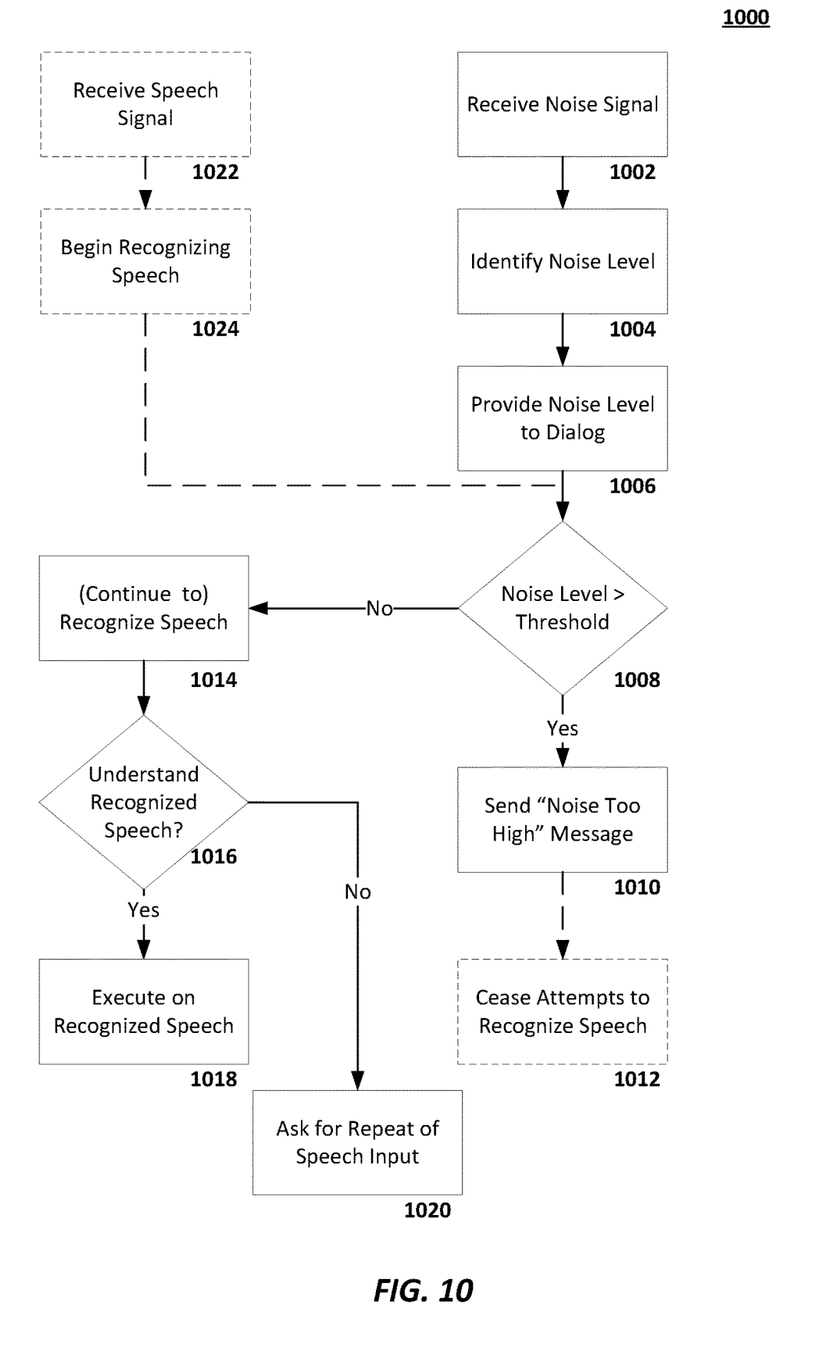
FIG. 10 is a process flow diagram for operating a dialog system.

FIG. 10 is a process flow diagram 1000 for operating a dialog system. The audio input can receive a noise signal (1002). The noise signal can be received with an audible speech signal or by itself. The noise level of the noise signal can be identified (1004). The noise level can be compared against a threshold value (1008). The comparison can be provided to and performed by the dialog system (1006) or by a signal processor (or both). If the noise level is greater than (or greater than or equal to) the threshold, then the dialog system can send a signal to the user that the noise level is too high (1010). If the noise level is less than or equal to (or less than) the threshold value, then the system can begin recognizing received audible speech input (1014). The dialog system can attempt to interpret the recognized speech (1016). If the dialog system can interpret the recognized speech, the dialog system execute on the recognized speech (e.g., respond with an appropriate answer, cause the device to do something, etc.) (1018). If the dialog system cannot interpret the recognized speech, then the dialog system can request that the user repeat the speech (1020).

In some embodiments, the speech signal is received at the same time as the noise signal (1022). The automatic speech recognition (ASR) can begin processing the speech input (1024). If the noise level is too high, however, then the processor can signal to the ASR to cease attempts to recognize speech (1012).

In some embodiments, the noise level is a signal to noise ratio (SNR). If the SNR is greater than (or greater than or equal to) a threshold value, then the dialog system can send a signal to the user that the noise level is too high (1010). If the SNR is greater than or equal to (or greater than) the threshold value, then the system can begin recognizing received audible speech input (1014).

Example 1 is a device that includes a speech input to receive audible speech from a user of the device; a noise input to receive audible background noise; a sound signal processor to determine a noise level from the received audible background noise; and a dialog system to receive a recognized speech signal; determine that the recognized speech input is indecipherable; determine that the noise level is greater than a threshold level; and output a message indicating that the audible background noise is causing the audible speech to be incomprehensible.

Example 2 may include the subject matter of example 1, further including an automatic speech recognition module implemented at least partially in hardware to receive a speech signal from the speech input, recognize the speech signal, and convert the recognized speech signal into a text format.

Example 3 may include the subject matter of example 2, wherein automatic speech recognition module comprises the sound signal processor and the automatic speech recognition module is further configured to receive a noise signal from the noise input and determine a noise level of the audible background noise.

Example 4 may include the subject matter of any of examples 1 or 2 or 3, wherein the determined noise level comprises a signal-to-noise ratio.

Example 5 may include the subject matter of any of examples 1 or 2 or 3 or 4, further comprising a memory implemented at least partially in hardware to store a threshold noise level. The dialog system is configured to compare a received noise level to the threshold noise level stored in memory; determine that the received noise level exceeds the threshold noise level; and output a message to the user that the background noise is too high.

Example 6 may include the subject matter of any of examples 1 or 2 or 3 or 4 or 5, further comprising a memory for storing historic noise data, wherein the dialog system is configured to dynamically determine that a received noise level is causing the audible speech to be incomprehensible.

Example 7 may include the subject matter of any of examples 1 or 2 or 3 or 4 or 5 or 6, wherein the dialog system is configured to determine that the audible speech signal is not understandable; request a noise level representing an audible background noise level; determine that the noise level causes the audible speech signal to be not understandable; and output a message to the user indicating that the background noise level is too high to understand the audible speech signal.

Example 8 is a method that includes receiving a speech signal representative of audible speech; processing the speech signal to interpret the speech signal by a dialog system implemented at least partially in hardware; determining, by the dialog system, that the speech signal cannot be correctly interpreted; receiving a noise signal representative of audible background noise; identifying a noise level from the noise signal; determining, by the dialog system, that the noise level is too high for the speech signal to be correctly interpreted; and providing, by the dialog system, a message indicating that the noise level is too high for the speech signal to be correctly interpreted.

Example 9 may include the subject matter of example 8, wherein receiving the speech signal and receiving the noise signal occur at the same time.

Example 10 may include the subject matter of example 8, further comprising requesting the noise signal based on determining that the speech signal cannot be correctly interpreted.

Example 11 may include the subject matter of any of examples 8 or 9 or 10, further comprises converting the speech signal into recognized text and providing the speech signal as recognized text to the dialog system.

Example 12 may include the subject matter of any of examples 8 or 9 or 10 or 11, wherein determining, by the dialog system, that the noise level is too high for the speech signal to be correctly interpreted comprises determining that the noise level is greater than, or greater than or equal to, the threshold value.

Example 13 may include the subject matter of any of examples 8 or 9 or 10 or 11, further comprising storing noise signals received over time; correlating noise signals received over time and failed attempts to interpret received speech signals; and determining a threshold noise level based on the correlation between noise signals received over time and the failed attempts to interpret received speech signals.

Example 14 is a system that includes a microphone to receive an audible speech signal and audible background noise; a signal processor to determine a noise level of the audible background noise; an automatic speech recognition system implemented at least partially in hardware to convert the audible speech signal to a text format; and a dialog system implemented at least partially in hardware to: attempt to interpret the text format of the audible speech signal; determine that the noise level of the audible background noise causes the text format of the audible speech to be uninterpretable; and provide a message that indicates that the audible speech cannot be interpreted because the audible background noise too high.

Example 15 may include the subject matter of example 14, wherein the automatic speech recognition module is further configured to receive a speech signal from the microphone, recognize the speech signal, and convert the recognized speech signal into a text format.

Example 16 may include the subject matter of 15, wherein the automatic speech recognition module comprises the sound signal processor and the automatic speech recognition module is further configured to receive a noise signal from the noise input and determine a noise level of the audible background noise.

Example 17 may include the subject matter of any of examples 14 or 15 or 16, wherein the determined noise level comprises a signal-to-noise ratio.

Example 18 may include the subject matter of example 14, further comprising a memory implemented at least partially in hardware to store a threshold noise level, and wherein the dialog system is configured to compare a received noise level to the threshold noise level stored in memory; determine that the received noise level exceeds the threshold noise level; and output a message to the user that the background noise is too high.

Example 19 may include the subject matter of example 14, further comprising a memory for storing historic noise data, wherein the dialog system is configured to dynamically determine that a received noise level is causing the audible speech to be incomprehensible.

Example 20 may include the subject matter of example 14, wherein the dialog system is configured to determine that the audible speech signal is not understandable; request a noise level representing an audible background noise level; determine that the noise level causes the audible speech signal to be not understandable; and output a message to the user indicating that the background noise level is too high to understand the audible speech signal.

Example 21 may include the subject matter of example 1, wherein the dialog system is configured to determine that the audible speech signal is not understandable; determine that the noise level is lower than a threshold value; and output a request to the user to repeat the audible speech.

Example 22 may include the subject matter of example 8 also including determining that the speech signal cannot be correctly interpreted; determining that the noise level is less than a threshold value; and requesting that the user repeat a speech signal representative of the audible speech.

Example 23 may include the subject matter of example 16, wherein the dialog system is configured to determine that the audible speech signal is not understandable; determine that the noise level is lower than a threshold value; and output a message to the user requesting the user to repeat the audible speech signal.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any disclosures or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A device comprising:
   an audio input to receive audible speech from a user of the device and to receive audible background noise;
   a sound signal processor to determine a noise level from the received audible background noise; and
   a dialog system to:
      receive a recognized speech signal;
      determine that the recognized speech input is indecipherable;
      determine that the noise level is greater than a threshold noise level; and
      output a message indicating that the audible background noise is causing the audible speech to be incomprehensible;
   wherein the dialog system is configured to:
      store noise signals received over time;
      correlate noise signals received over time and failed attempts to interpret received speech signals; and
      determine the threshold noise level based on the correlation between noise signals received over time and the failed attempts to interpret received speech signals; and
      use the threhsold noise level to determine that the speech signal incomprehensible.

2. The device of claim 1, further comprising an automatic speech recognition module implemented at least partially in hardware to receive a speech signal from the speech input, recognize the speech signal, and convert the recognized speech signal into a text format.

3. The device of claim 2, wherein automatic speech recognition module comprises the sound signal processor and the automatic speech recognition module is further configured to receive a noise signal from the audio input and determine a noise level of the audible background noise.

4. The device of claim 1, wherein the determined noise level comprises a signal-to-noise ratio.

5. The device of claim 1, further comprising a memory implemented at least partially in hardware to store a threshold noise level, and wherein
   the dialog system is configured to:
   compare a received noise level to the threshold noise level stored in memory;
   determine that the received noise level exceeds the threshold noise level; and
   output a message to the user that the background noise is too high.

6. The device of claim 1, further comprising a memory for storing historic noise data, wherein the dialog system is configured to:
   dynamically determine that a received noise level is causing the audible speech to be incomprehensible.

7. The device of claim 1, wherein the dialog system is configured to:
   determine that the audible speech signal is not understandable;
   request a noise level representing an audible background noise level;
   determine that the noise level causes the audible speech signal to be not understandable; and
   output a message to the user indicating that the background noise level is too high to understand the audible speech signal.

8. The device of claim 1, wherein the dialog system is configured to:
   determine that the audible speech signal is not understandable;

determine that the noise level is lower than a threshold value; and output a request to the user to repeat the audible speech.

9. A method comprising:

receiving a speech signal representative of audible speech;

processing the speech signal to interpret the speech signal by a dialog system implemented at least partially in hardware;

determining, by the dialog system, that the speech signal cannot be correctly interpreted;

receiving a noise signal representative of audible background noise;

identifying a noise level from the noise signal;

determining, by the dialog system, that the noise level is too high for the speech signal to be correctly interpreted; and providing, by the dialog system, a message indicating that the noise level is too high for the speech signal to be correctly interpreted;

the method further comprising:

storing noise signals received over time;

correlating noise signals received over time and failed attempts to interpret received speech signals; and determining a threshold noise level based on the correlation between noise signals received over time and the failed attempts to interpret received speech signals; and using the threhsold noise level to determine that the speech signal cannot be correctly interpreted.

10. The method of claim 9, wherein receiving the speech signal and receiving the noise signal occur at the same time.

11. The method of claim 9, further comprising requesting the noise signal based on determining that the speech signal cannot be correctly interpreted.

12. The method of claim 9, further comprises converting the speech signal into recognized text and providing the speech signal as recognized text to the dialog system.

13. The method of claim 9, wherein determining, by the dialog system, that the noise level is too high for the speech signal to be correctly interpreted comprises determining that the noise level is greater than, or greater than or equal to, a threshold value.

14. The method of claim 9, further comprising:

determining that the speech signal cannot be correctly interpreted;

determining that the noise level is less than a threshold value; and requesting that the user repeat a speech signal representative of the audible speech.

15. A system comprising:

a microphone to receive an audible speech signal and audible background noise;

a signal processor to determine a noise level of the audible background noise;

an automatic speech recognition system implemented at least partially in hardware to convert the audible speech signal to a text format; and a dialog system implemented at least partially in hardware to:

attempt to interpret the text format of the audible speech signal;

determine that the noise level of the audible background noise causes the text format of the audible speech to be uninterpretable; and provide a message that indicates that the audible speech cannot be interpreted because the audible background noise too high;

wherein the dialog system is configured to:

store noise signals received over time;

correlate noise signals received over time and failed attempts to interpret received speech signals; and determine a threshold noise level based on the correlation between noise signals received over time and the failed attempts to interpret received speech signals; and use the threhsold noise level to determine that the speech signal is uninterpretable.

16. The system of claim 15, wherein the automatic speech recognition module is further configured to receive a speech signal from the microphone, recognize the speech signal, and convert the recognized speech signal into a text format.

17. The system of claim 15, wherein the automatic speech recognition module comprises the sound signal processor and the automatic speech recognition module is further configured to receive a noise signal from the microphone and determine a noise level of the audible background noise.

18. The system of claim 15, wherein the determined noise level comprises a signal-to-noise ratio.

19. The system of claim 15, further comprising a memory implemented at least partially in hardware to store a threshold noise level, and wherein the dialog system is configured to:

compare a received noise level to the threshold noise level stored in memory;

determine that the received noise level exceeds the threshold noise level; and output a message to the user that the background noise is too high.

20. The system of claim 15, further comprising a memory for storing historic noise data, wherein the dialog system is configured to:

dynamically determine that a received noise level is causing the audible speech to be incomprehensible.

21. The system of claim 15, wherein the dialog system is configured to:

determine that the audible speech signal is not understandable;

determine that the noise level causes the audible speech signal to be not understandable; and output a message to the user indicating that the background noise level is too high to understand the audible speech signal.

22. The system of claim 15, wherein the dialog system is configured to:

determine that the audible speech signal is not understandable;

determine that the noise level is lower than a threshold value; and output a message to the user requesting the user to repeat the audible speech signal.

* * * * *

UNITED STATES PATENT AND TRADEMARK OFFICE
CERTIFICATE OF CORRECTION

PATENT NO.            : 9,818,404 B2
APPLICATION NO.       : 14/979189
DATED                 : November 14, 2017
INVENTOR(S)           : Robert Jim Firby and Peter Graff It is certified that error appears in the above-identified patent and that said Letters Patent is hereby corrected as shown below:

In the Claims

In Column 14, Line 24, in Claim 1, delete "threhsold" and insert -- threshold --, therefor.

In Column 15, Line 28, in Claim 9, delete "threhsold" and insert -- threshold --, therefor.

In Column 16, Line 16 (approx.), in Claim 15, delete "threhsold" and insert -- threshold --, therefor.

Signed and Sealed this
Twenty-fourth Day of April, 2018

Andrei Iancu
*Director of the United States Patent and Trademark Office*